US012596374B2

(12) United States Patent
Harasaki

(10) Patent No.: US 12,596,374 B2
(45) Date of Patent: Apr. 7, 2026

(54) TRAVELING VEHICLE SYSTEM

(71) Applicant: MURATA MACHINERY, LTD.,
Kyoto (JP)

(72) Inventor: Kazumi Harasaki, Inuyama (JP)

(73) Assignee: MURATA MACHINERY, LTD.,
Kyoto (JP)

( * ) Notice: Subject to any disclaimer, the term of this
patent is extended or adjusted under 35
U.S.C. 154(b) by 391 days.

(21) Appl. No.: 18/015,740

(22) PCT Filed: Apr. 22, 2021

(86) PCT No.: PCT/JP2021/016308
§ 371 (c)(1),
(2) Date: Jan. 12, 2023

(87) PCT Pub. No.: WO2022/014116
PCT Pub. Date: Jan. 20, 2022

(65) Prior Publication Data
US 2023/0259141 A1 Aug. 17, 2023

(30) Foreign Application Priority Data
Jul. 17, 2020 (JP) ................................. 2020-122913

(51) Int. Cl.
G05D 1/00 (2024.01)

(52) U.S. Cl.
CPC ......... G05D 1/0274 (2013.01); G05D 1/0027
(2013.01)

(58) Field of Classification Search
CPC .. G05D 1/0274; G05D 1/0027; G05D 1/0297;
G05D 1/02; G06Q 10/0631
See application file for complete search history.

(56) References Cited

U.S. PATENT DOCUMENTS 5,283,739 A * 2/1994 Summerville ....... G05D 1/0289
700/255
6,237,500 B1 * 5/2001 Lund ...................... B61L 3/225
104/88.01
(Continued)

FOREIGN PATENT DOCUMENTS

JP 3191578 B2 7/2001
JP 2009-009365 A 1/2009

OTHER PUBLICATIONS

English translation of Watanabe JPH0887326A (Year: 2025).*

*Primary Examiner* — Scott A Browne
*Assistant Examiner* — Shahira Baajour
(74) *Attorney, Agent, or Firm* — Keating & Bennett, LLP

(57) ABSTRACT

A travel vehicle system includes a travel controller to search
a travel route that leads a travel vehicle to a station included
in a transport instruction in accordance with map informa-
tion and to control a travel of the travel vehicle along the
travel route when the transport instruction is issued. The
map information includes information on a specified point
corresponding to at least one of a branching portion and a
confluence portion. In addition to a one direction travel
control to cause the travel vehicle to travel in one direction,
the travel control sets a reverse travel zone in which the
travel vehicle travels in a direction opposite to the one
direction from/to the specified point as at least a portion of
the travel route and causes the travel vehicle to travel along
the travel route by performing a turnover travel control to
cause the travel vehicle to travel in a direction opposite to
the one direction in the reverse travel zone.

4 Claims, 5 Drawing Sheets

(56)           References Cited

U.S. PATENT DOCUMENTS

2005/0043884 A1 *    2/2005    Atarashi ............ G01C 21/3415
                                                     340/995.19
2009/0000505 A1      1/2009    Shimamura et al.

* cited by examiner

TRAVELING VEHICLE SYSTEM

BACKGROUND OF THE INVENTION

1. Field of the Invention

An aspect of the present invention relates to a travel vehicle system to cause a travel vehicle to travel on a predetermined travel path.

2. Description of the Related Art

Known is a travel vehicle system (e.g., Japanese Unexamined Patent Application Publication No. 2009-9365) that causes a plurality of travel vehicles to travel automatically on a travel path provided on a ceiling or a floor in advance by computer control. The travel path is defined to be one-way to prevent the travel vehicles from traveling face-to-face. In such a travel vehicle system, loading (an article is loaded onto a travel vehicle from a placement table) and unloading (an article is unloaded from a travel vehicle onto a placement table) are performed between a placement table (station) and a travel vehicle. When an article loading request for a certain placement table (hereinafter, called "a target placement table") is issued, this travel vehicle system searches an empty travel vehicle located at a position closest to the target placement table and allocates a transport instruction to move to the target placement table and receive an article with respect to the searched empty travel vehicle.

SUMMARY OF THE INVENTION

However, in a transport vehicle system in which at least one of a branching portion and a confluence portion is provided, since a travel path is defined to be one-way, a route along which a travel vehicle travels in one direction and reaches a target placement table is searched, so that the searched route may be roundabout. Therefore, it may take time for the travel vehicle to reach the target placement table, thus reducing a transport efficiency.

Preferred embodiments of the present invention provide transport vehicle systems each capable of improving a transport efficiency.

A transport vehicle system according to an aspect of a preferred embodiment of the present invention includes a travel path including at least one of a branching portion and a confluence portion, travel vehicles to travel along the travel path in one direction and transfer an article with respect to individual placement tables provided along the travel path, and a travel vehicle controller configured or programmed to control travel of each of the travel vehicles in accordance with a transport command. The travel vehicle controller is configured or programmed to include a travel controller to search for a travel route along which each of the travel vehicles is caused to travel to a predetermined one of the placement tables included in the transport command and to cause each of the travel vehicles to travel in accordance with the travel route based on map information including information on the travel path and the placement tables when the transport command is issued. The map information further includes information on a specified point corresponding to at least one of the branching portion and the confluence portion. The travel controller is configured or programmed to perform one-way travel control to cause each of the travel vehicles to travel in the one direction and to perform reverse travel control that sets a reverse travel zone in which each of the travel vehicles is caused to travel in a direction opposite to the one direction from or to the specified point as at least a portion of the travel route and causes each of the travel vehicles to travel in the direction opposite to the one direction in the reverse travel zone so that each of the travel vehicles is caused to travel in accordance with the travel route.

The words "an upstream" and "a downstream" used in this description mean an upstream and a downstream in a predetermined traveling direction ("one direction" as described above) of a travel vehicle. When the branching portion or the confluence portion exists in the travel path in the travel vehicle system in which the travel vehicle travels along the travel path set to be one-way, that is, in the travel vehicle system in which the travel vehicle travels in one direction, the travel vehicle may need to make a detour to reach a predetermined placement table. For example, it is when a travel vehicle located at an upstream side of the confluence portion in one travel path which joins the confluence portion travels toward the placement table provided at slightly upstream side of the confluence portion in the other travel path which joins the confluence portion. In this case, the travel vehicle controller searches a travel route that causes the travel vehicle to reach the placement table from the upstream of the one travel path, however, a distance of the travel route is generally long.

Therefore, a travel controller of a travel vehicle system according to an aspect of the present invention is configured or programmed to set the one travel path ranging from the specified point corresponding to the confluence portion at a downstream side of the placement table to the placement table as a reverse travel zone. Then the travel controller causes the travel vehicle to travel in a reverse direction in the reverse travel zone using the turnover travel control, so that the travel vehicle enters the placement table. The travel route including such a reverse travel zone is shorter than the conventional travel route that causes the travel vehicle to reach the placement table from an upstream of the one travel path. Thus, the time until the travel vehicle reaches a predetermined placement table is shortened, enabling an improvement of transport efficiency. "To cause a travel vehicle to enter a placement table" means "to cause the travel vehicle to enter a position at which an article can be loaded or unloaded from/to the placement table".

In a travel vehicle system according to an aspect of the present invention, a reverse entry flag showing whether or not the reverse travel control causes entry into one of the placement tables is associated with each of the placement tables in the map information. The travel controller may cause each of the travel vehicles to travel in reverse in the reverse travel zone extending from the specified point closest to the predetermined one of the placement tables downstream in the one direction to the predetermined one of the placement tables by the reverse travel control to cause each of the travel vehicles to enter the predetermined one of the placement tables in a case where each of the travel vehicles is caused to enter the predetermined one of the placement tables having the reverse entry flag indicating the reverse travel control causing entry. Thus, by the turnover travel control, the travel vehicle can enter into a placement table that has a possibility that the arrival time of the travel vehicle can be shortened by an entry of the travel vehicle by the turnover travel control.

In a travel vehicle system according to an aspect of the present invention, in the map information, a reverse exit flag showing whether or not the reverse travel control causes exit from one of the placement tables is associated with each of the placement tables in the map information. The travel controller may cause each of the travel vehicles to travel in reverse in the reverse travel zone extending from the predetermined one of the placement tables to the specified point closest to the predetermined one of the placement tables upstream in the one direction by the reverse travel control to cause each of the travel vehicles to exit from the predetermined one of the placement tables in a case where each of the travel vehicles is caused to exit from the predetermined one of the placement tables having the reverse exit flag indicating the reverse travel control causing exit. Thus, by the turnover travel control, the travel vehicle can exit from the placement table that has a possibility that the time until the travel vehicle reaches the next target placement table can be shortened by an exit of the travel vehicle by the turnover travel control. The "to cause a travel vehicle to exit from a placement table" means "to cause the travel vehicle to exit from a position at which an article can be loaded or unloaded from/to the placement table".

In a travel vehicle system according to an aspect of the present invention, the travel vehicle controller may further include a command allocator to identify a travel vehicle subject to the transport command from among the travel vehicles. The transport command may include information on a predetermined one of the placement tables defining a destination. The command allocator may search for the specified point first found downstream in the one direction starting from the predetermined one of the placement tables defining the destination and search for the travel vehicle first found upstream in the one direction starting from the searched specified point in a case where the reverse entry flag associated with the predetermined one of the placement tables defining the destination included in the transport command indicates the reverse travel control causing entry. In the conventional travel vehicle system, despite the existence of an adjacent travel vehicle closest to the target placement table along the travel path, the adjacent travel vehicle may be determined to be a long way to reach the target placement table due to one-way route, thus, another travel vehicle different from the adjacent travel vehicle may be selected. In this case, the time until the travel vehicle reaches the target placement table is long. In a travel vehicle system according to an aspect of the present invention, regardless of a predetermined traveling direction of the travel vehicle, a travel vehicle closest to the target placement table along the travel path is selected, thus the time until the travel vehicle reaches the target placement table can be shortened.

In a travel vehicle system according to an aspect of the present invention, the travel vehicle controller may further include a command allocator to identify a travel vehicle subject to the transport command from among the travel vehicles. The transport command may include information on one of the placement tables defining a source and on a predetermined one of the placement tables defining a destination. The command allocation portion may search for the specified point first found downstream in the one direction starting from the predetermined one of the placement tables defining the source and search for the travel vehicle first found upstream in the one direction starting from the searched specified point in a case where the reverse entry flag associated with the one of the placement tables defining the source included in the transport command indicates the reverse travel control causing entry. In the conventional travel vehicle system, despite the existence of an adjacent travel vehicle close to the target placement table along the travel path, the adjacent travel vehicle may be determined to be a long way to reach the target placement table due to one-way route, thus, another travel vehicle different from the adjacent travel vehicle may be selected. In this case, the time until the travel vehicle reaches the target placement table is long. In a travel vehicle system according to an aspect of the present invention, regardless of a predetermined traveling direction of the travel vehicle, the travel vehicle closest to the target placement table along the travel path is selected, thus the time until the travel vehicle reaches the target placement table can be shortened.

According to aspects of preferred embodiments of the present invention, a transport efficiency is improved.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
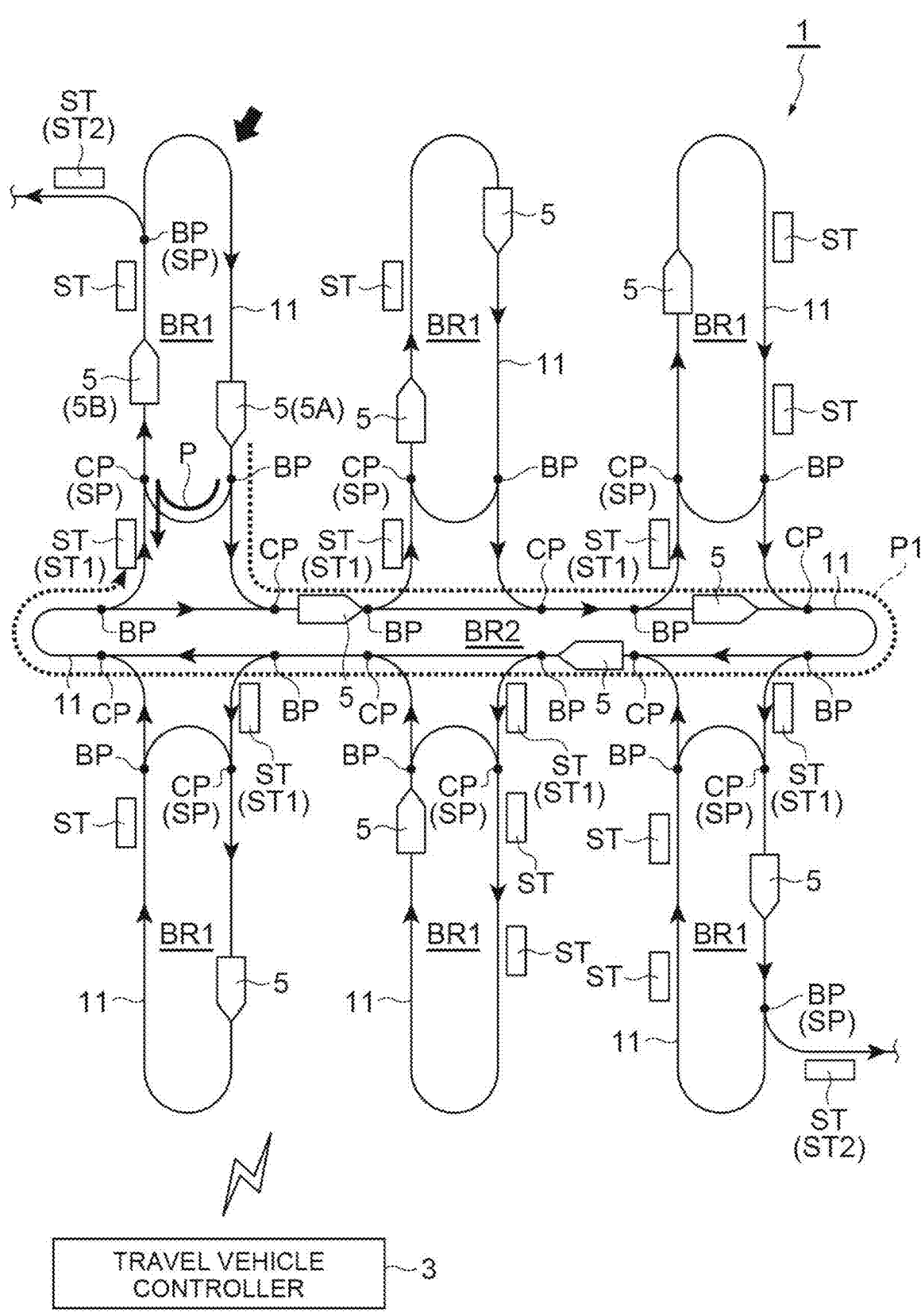
FIG. 1 is a configuration diagram showing a configuration of a travel vehicle system according to a preferred embodiment of the present invention.

Hereinafter, preferred embodiments will be described with reference to the drawings. In the description of the drawings, the same elements will be denoted by the same reference symbols, without redundant description. The dimensional ratio of the drawing does not necessarily coincide with one of the description. In addition, "upstream" and "downstream" used for description of the preferred embodiments mean "upstream" and "downstream" in a predetermined traveling direction (a direction of arrow indicated on a track 11 as shown in FIG. 1) of a travel vehicle 5.

A travel vehicle system 1 transports an article using a travel vehicle 5 capable of moving along a track (travel path). The travel vehicle 5 is an unmanned travel vehicle such as an overhead travel vehicle, a rail-guided vehicle, or the like. An example of a travel vehicle system 1 in which an overhead travel vehicle 5 (hereinafter, simply called "travel vehicle 5") travels along a one-way track provided on a ceiling in a factory will be described. As shown in FIG. 1, the travel vehicle system 1 includes mainly a track 11, a plurality of stations (placement tables) ST, a plurality of travel vehicles 5, and a travel vehicle controller 3.

The track 11 is a member on which the travel vehicle 5 travels, and is suspended from a ceiling. FIG. 1 shows a layout of the track 11 according to the present preferred embodiment. In the present preferred embodiment, the track 11 is divided into a plurality of sections (bays) (six sections in the example of FIG. 1). The track 11 includes an intra-bay-route BR1 which is a travel path in a bay and an inter-bay-route BR2 which is a travel path connecting between different bays. In the intra-bay-route BR1, the travel vehicle 5 is set to travel clockwise in one direction. As with the intra-bay-route BR1, also in the inter-bay-route BR2, the travel vehicle 5 is set to travel clockwise in one direction. A branching portion BP at which the track 11 is branched and a confluence portion CP at which the tracks 11 join are provided in the intra-bay-route BR1 and the inter-bay-route BR2.

The station ST is provided along the track 11. The station ST is a portion where an article is transferred with respect to the transport vehicle 5. An example of the station ST, for example, in a semiconductor processing factory includes a load port where a FOUP is delivered between a semiconductor processing device and the transport vehicle 5, and a buffer where the FOUP is temporarily placed by the travel vehicle 5.

Figure 2:
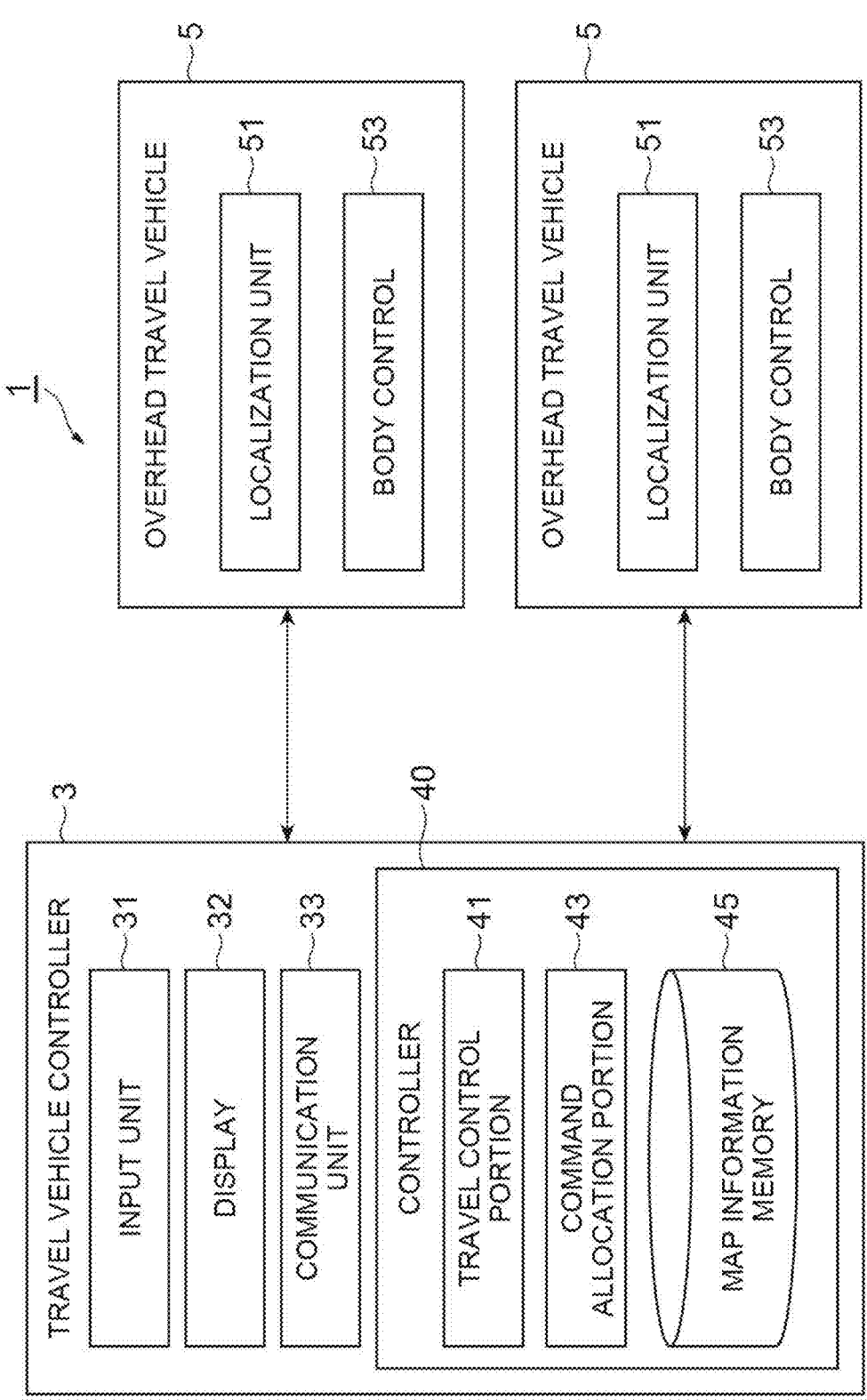
FIG. 2 is a functional block diagram showing a functional configuration of the travel vehicle system of FIG. 1.

The travel vehicle 5 is capable of transferring an article. In addition to a mechanism to transfer an article, the travel vehicle 5 includes a localization unit 51 and a body control unit 53 as shown in FIG. 2.

The localization unit 51 obtains a position of its own vehicle body located on the track 11. The localization unit 51 may include, for example, a reader which is readable a barcode attached to the track 11 and showing point information and an encoder. The localization unit 51 transmits point information obtained by the reader and a traveling distance to a travel vehicle controller 3 as a position data. The traveling distance is a distance after passing the point and is obtained by the encoder. The information obtained by the localization unit 51 is periodically or continuously transmitted to the travel vehicle controller 3, so that the travel vehicle controller 3 can obtain a position of the travel vehicle 5.

The body control unit 53 is configured or programmed to control a travel of the travel vehicle 5 and may be an electrical control unit including, for example, a CPU (Central Processing Unit), a ROM (Read Only Memory), and a RAM (Random Access Memory). The body control unit 53 is configured or programmed to control a travel of the travel vehicle 5 based on a transport instruction transmitted by the travel vehicle controller. The transport instruction will be described later.

The travel vehicle controller 3 is configured or programmed to control the travel vehicle 5. In more detail, the travel vehicle controller 3 is configured or programmed to perform a travel control function to control a travel of the travel vehicle 5 based on a transport instruction transmitted from an upper controller (not illustrated). In addition, the travel vehicle controller 3 is configured or programmed to control each travel of a plurality of travel vehicles 5 and to perform an allocation function to allocate a transport instruction to each of a plurality of the travel vehicle 5. The travel vehicle controller 3 makes periodical inquiries to each travel vehicle 5 about whether or not an article is placed thereon so as to determine a presence or absence of loaded article.

As shown in FIG. 2, the travel vehicle controller 3 includes an input unit 31, a display 32, a communication unit 33, and a controller 40. The input unit 31 includes, for example, a keyboard and a mouse, or the like. Various operations and set values are input in the input unit 31 by a user. The display 32 includes, for example, a liquid crystal display, and displays various setting screens or input screens onto which a user inputs through the input unit 31 or the like.

The communication unit 33 is a processor configured or programmed to communicate with other devices and, for example, to transmit a transport instruction to a travel vehicle 5 or receive information about a present position of travel vehicle 5 and about presence or absence of an article placed on a travel vehicle 5 through a wireless communication network. In addition, the communication unit 33 receives a transport instruction including information of stations ST which are a starting point (source) and an end point (destination) from an upper controller through LAN (Local Area Network), for example.

The controller 40 is configured or programmed to perform various control processing (to be described later) in the travel vehicle system 1, and includes a CPU, a ROM, and a RAM, for example. As shown in FIG. 2, the controller 40 is configured or programmed to include a travel control portion 41, and a command allocation portion 43 as a conceptual portion to perform various control processing in the travel vehicle system 1, and a map information memory 45. The travel control portion 41 and the command allocation portion 43 defined as a such conceptual portion can be configured as, for example, software in which program stored in the ROM is loaded on the RAM and is executed with the CPU. The map information memory 45 is configured as hardware such as SSD (Solid State Drive) or HDD (Hard Disk Drive). The controller 40 may be configured as hardware such as an electronic circuit.

When a transport instruction is issued, the transport control portion 41 searches a travel route that leads the travel vehicle 5 to a predetermined station ST included in the transport instruction based on map information and causes the travel vehicle 5 to travel along the searched travel route. In the present preferred embodiment, the transport instruction is transmitted from an upper controller. The map information relates to the track 11 and the station ST and is stored in the map information memory 45. In more detail, the map information is layout information showing placement of the track 11 and arrangement of station ST. The placement of the track 11 is illustrated by a plurality of nodes and a plurality of links. The arrangement of the station ST is illustrated in association with the nodes or location (point information) set for each node.

Figures 3A, 3B:
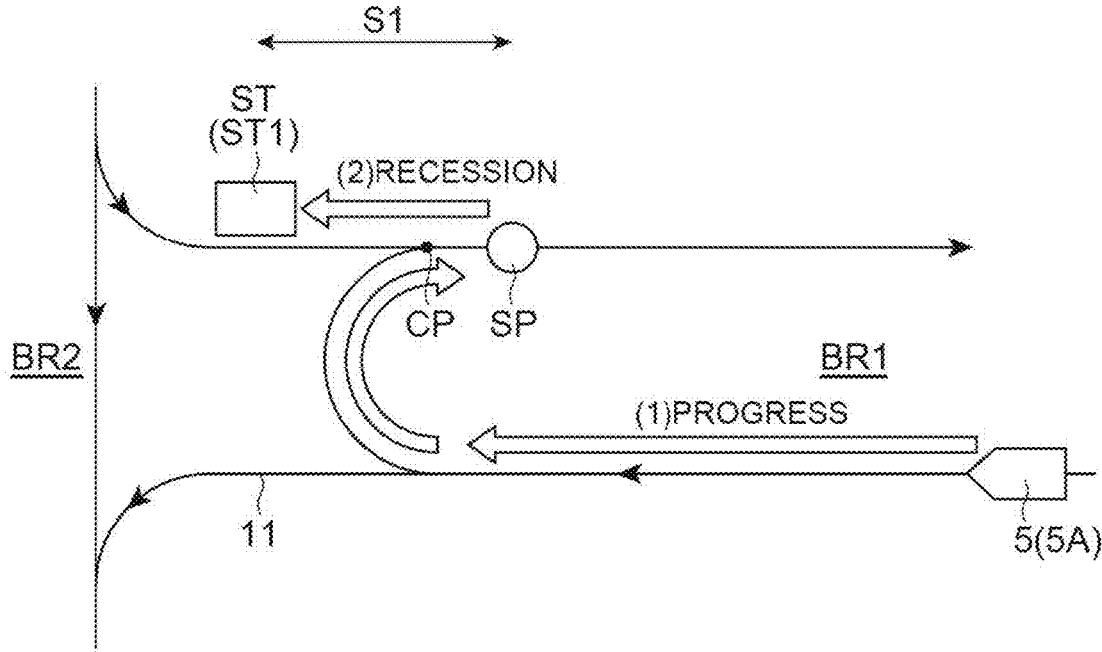
FIG. 3A is a diagram explaining a turnover travel control and FIG. 3B is a diagram showing a method of searching a travel vehicle starting from a station having a turnover entry flag.
Figure 5:
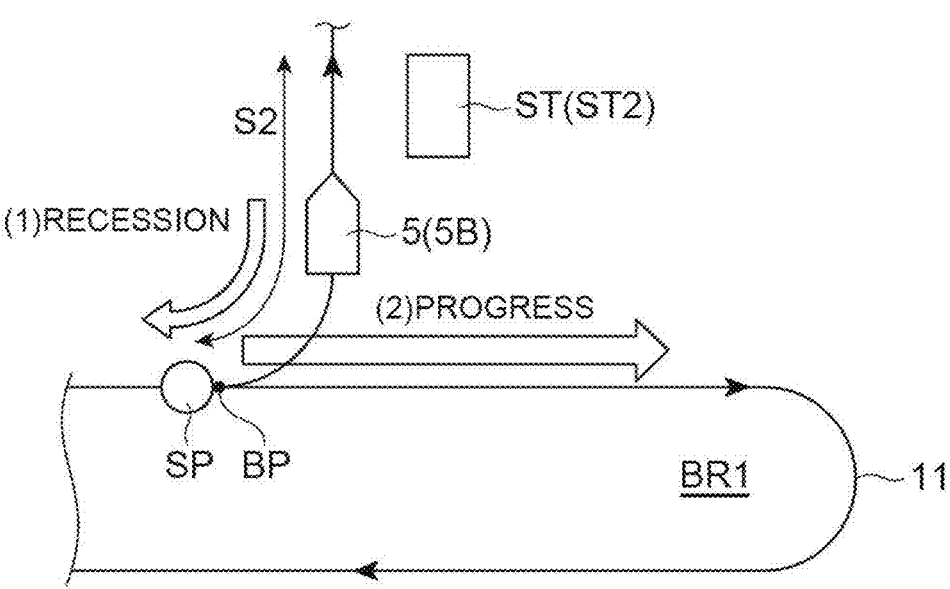
FIG. 5 is a diagram explaining a turnover travel control.

The map information will now be described. The map information of the present preferred embodiment includes information about a specified point SP corresponding to the branching portion BP and confluence portion CP. The specified point SP is information about a location where the travel vehicle 5 performs a turnover travel control. The turnover travel control will be described later. The specified point SP corresponding to the conference portion CP according to the present preferred embodiment is provided at a slight downstream side from the confluence portion CP as shown in FIG. 3A, for example. The specified point SP corresponding to the branching portion BP is provided at a slight upstream side from the branching portion BP as shown in FIG. 5, for example. The specified point SP may coincide with a location of the confluence portion CP and a location of the branching portion BP.

Further, in the map information of the present preferred embodiment, a turnover entry flag showing whether or not the entry of the travel vehicle 5 into the station ST is caused by the turnover travel control is associated with each of the stations ST and a turnover exit flag showing whether or not the exit of the travel vehicle 5 from the station ST is caused by the turnover travel control is also associated with each of the stations ST. The "turnover entry" means that, as shown in FIG. 3A, the travel vehicle 5 is controlled to travel in a direction opposite to a normal traveling direction and to enter a station ST1. "The travel vehicle 5 is controlled to enter the station ST1" means that the travel vehicle 5 is controlled to enter a position at which the travel vehicle 5 can load and unload an article to/from the station ST1. The "turnover exit" means that, as shown in FIG. 5, the travel vehicle 5 is controlled to travel in a direction opposite to a normal traveling direction and to exit from a station ST2. The "the travel vehicle 5 is controlled to enter the station ST2" means that the travel vehicle 5 is controlled to enter a position at which the travel vehicle 5 can load and unload an article to/from the station ST2.

In addition to a one-way travel control to cause the travel vehicle 5 to travel in one direction, the travel control portion 41 sets a reverse travel zone S1 and S2 (refer to FIGS. 3A and 5), which is a zone where the travel vehicle 5 travels in a direction opposite to one direction from/to the specified point SP, as at least a portion of a travel route, and performs a turnover travel control to cause the travel vehicle 5 to travel in a direction opposite to the one direction in the reverse travel zone S1 and S2, whereby the travel control portion 41 causes the travel vehicle 5 to travel along the searched travel route. That is, the travel control portion 41 in the present preferred embodiment may set the reverse travel zone S1 and S2, which are zones where the travel vehicle 5 exceptionally travels in a direction opposite to one direction from/to the specified point SP, as at least a portion of the travel route, and also may control a travel of the travel vehicle 5 along the travel route including the reverse travel zone S1 and S2. The turnover travel control is to cause the travel vehicle 5 to travel from/to the specified point SP in a direction opposite to a predetermined traveling direction (clockwise in an intra-bay-route BR1 and an inter-bay-route BR2: a direction of arrow) of the travel vehicle 5.

As shown in FIG. 3A, in order to cause the travel vehicle 5 to enter a station ST1 (ST) having a turnover entry flag showing an entry by the turnover travel control, the travel control portion 41 performs the turnover travel control in the reverse travel zone S1 ranging from the specified point SP closest to the station ST1 at a downstream side to the station ST1, so that the travel vehicle 5 enters the station ST1. As shown in FIG. 5, in order to cause travel vehicle 5 to exit from a station ST2 (ST) having a turnover exit flag showing an exit by the turnover travel control, the travel control portion 41 performs the turnover travel control in the reverse travel zone S1 ranging from the station ST2 (ST) to the specified point SP closest to the station ST2 (ST) at an upstream side, so that the travel vehicle 5 exits (escapes) from the station ST2 (ST).

The command allocation portion 43 identifies a travel vehicle subject to the transport instruction from among a plurality of travel vehicles 5. The transport instruction transmitted from an upper controller (not illustrated) will now be described. There are two types of transport instructions. One is a transport instruction including information on a station ST which is a destination (hereinafter, called "a first transport instruction"). The other is a transport instruction including information on stations ST which are both a source and a destination (hereinafter, called "a second transport instruction"). In response to a receipt of the transport instruction transmitted by the upper controller, the travel vehicle controller 3 selects one travel vehicle 5 from among a plurality of travel vehicles 5 and moves the selected travel vehicle 5 to a station ST which is a destination or a source.

After receiving the first transport instruction, the travel vehicle controller 3 moves the travel vehicle 5 to the station ST which is a destination so that the destination included in the transport instruction can receive (load) an article. Whereas, after receiving the second transport instruction, the travel vehicle controller 3 moves the travel vehicle 5 to a station ST which is a source so that the travel vehicle 5 can receive (load) an article from the station ST which is the source. Next, the travel vehicle controller 3 moves the travel vehicle 5 to a station ST which is a destination so that the travel vehicle 5 can deliver (unload) an article onto the station ST which is the destination.

When a turnover entry flag associated with a station ST which is a destination or a source included in the transport instruction shows an entry by the turnover travel control, the command allocation portion 43 is characterized by a method of searching the travel vehicle 5 to be moved to the station ST. That is, when searching a travel vehicle 5 to be moved to a station ST without a turnover entry flag, instead of searching an empty travel vehicle 5 which is first found in an upstream direction from the station ST, the command allocation portion 43 in the present preferred embodiment searches a specified point to be first found in a downstream direction from a station ST which is a destination or a source and identifies a travel vehicle 5 to be first found in an upstream direction starting from the searched specified point. "A travel vehicle 5 to be first found" means "a travel vehicle 5 located at the shortest distance along the track 11". When there is a branch toward an upstream direction from the searched specified point, both of the branched tracks may be searched, or only the track 11 at a side without a station ST corresponding to the specified point may be searched as a target.

Hereinafter, a flow until the travel vehicle 5 is moved to the station ST1 when the station ST, which is a destination, included in the first transport instruction received by the travel vehicle controller 3 is a station ST1 existing in intra-bay-route BR1 indicated by a black and wide arrow in FIG. 1 and the turnover entry flag is set in the station ST1, will be described as follows.

Figures 4A, 4B:
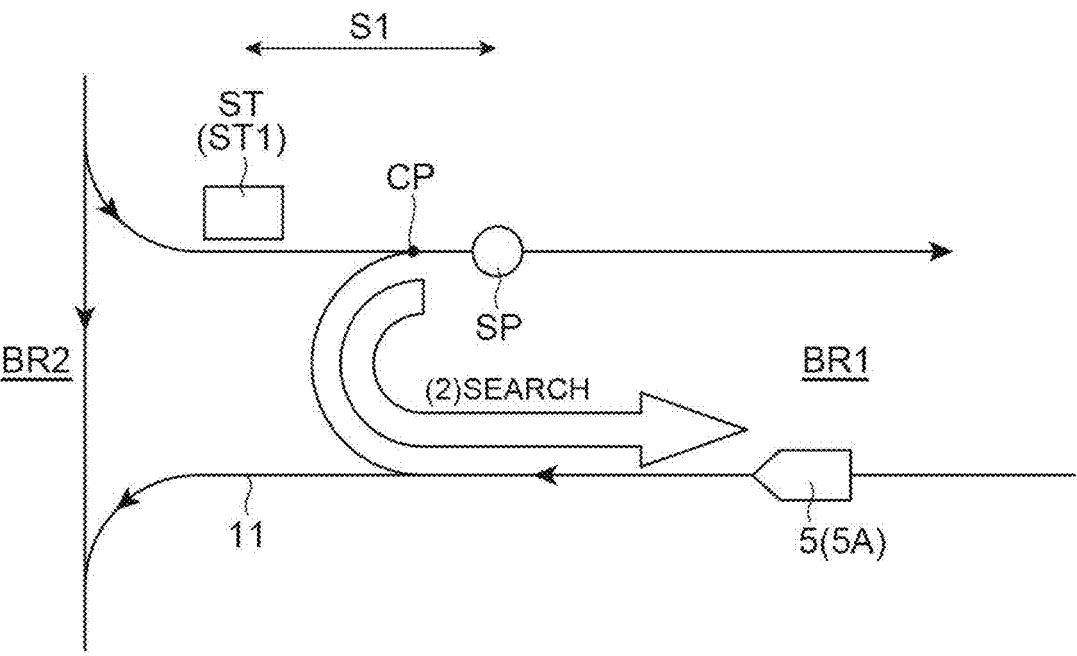
FIGS. 4A and 4B are diagrams showing a method of searching a travel vehicle starting from a station having a turnover entry flag.

After checking that the turnover entry flag is set in the station ST1, the command allocation portion 43 searches a specified point SP to be first found in a downstream direction starting from the station ST1 as shown in FIG. 3B. Next, as shown in FIG. 4A, the command allocation portion 43 searches a travel vehicle 5 to be first found in upstream direction starting from the searched specified point SP. That is, the command allocation portion 43 allocates a transport instruction to a travel vehicle 5A identified in this manner. In the present preferred embodiment, the track 11 is branched in an upstream direction from the searched specified point SP, and only the track 11 at a side without the station ST1 corresponding to the specified point SP is searched as a target to find a travel vehicle 5.

Next, as shown in FIG. 4B, the travel control portion 41 searches a route along which the travel vehicle 5A, to which the transport instruction has been allocated, reaches the station ST1 (route search). After checking that the station ST1 has the turnover entry flag, the travel control portion 41 searches a specified point SP corresponding to the station ST1 where the turnover travel control is controlled, which is first found in a downstream direction starting from the present position of the travel vehicle 5 to which the transport instruction has been allocated.

The travel control portion 41 sets the reverse travel zone S1 to cause the travel vehicle 5A to exceptionally travel in a direction opposite to one direction starting from the searched specified point SP and controls a travel of the travel vehicle 5A along the travel route including the reverse travel zone S1. That is, the travel control portion 41 causes the travel vehicle 5A to move in one direction from its present position to a position of the searched specified point SP and performs the turnover travel control at the specified point SP to cause the travel vehicle 5A to travel in a reverse direction in the reverse travel zone S1. Thus, the travel vehicle 5A reaches the station ST1.

Further, when the station ST, which is a source and included in the second transport instruction received by the travel vehicle controller 3, is a station ST2 existing in the intra-bay-route BR1 indicated by a black and wide arrow in FIG. 1, the turnover exit flag is set in the station ST2, and the station ST which is a destination is the station ST1 existing in the intra-bay-route BR1 indicated by a black and wide arrow in FIG. 1, and the turnover entry flag is set in the station ST1, the travel vehicle 5 is moved to the station ST1 via the station ST2. This flow will be described.

As shown in FIG. 1, the command allocation portion 43 searches a travel vehicle 5 to be first found in an upstream direction starting from the station ST2 which is a source. That is, the command allocation portion 43 allocates the transport instruction to the travel vehicle 5B identified in this manner. Next, the travel control portion 41 searches a route along which the allocated travel vehicle 5B reaches the station ST2 (route search). The travel control portion 41 searches a travel route along which the travel vehicle 5B travels in one direction from its present position to reach the station ST2.

Next, the travel control portion 41 searches a route along which the travel vehicle 5B reaches the station ST1 from the station ST2 (route search). After checking that the station ST2 has the turnover exit flag, the travel control portion 41 searches a specified point SP corresponding to the station ST2 where the turnover travel control is performed, which is first found in an upstream direction starting from a present position of the station ST2.

As shown in FIG. 5, the travel control portion 41 sets the reverse travel zone S2 in which the travel vehicle 5 travels exceptionally in a direction opposite to one direction toward the specified point SP searched in this manner, and controls a travel of the travel vehicle 5 along the travel route including the reverse travel zone S2. That is, the travel control portion 41 causes the travel vehicle 5 to move in an opposite direction in the reverse travel zone S2 ranging from the station ST2 to the searched specified point SP, and performs the turnover travel control at the specified point SP to cause the travel vehicle 5 to move in one direction on the track 11 within the intra-bay-route BR1.

Next, as shown in FIGS. 3A and 3B, after checking that the station ST1 has the turnover entry flag, the travel control portion 41 searches the specified point SP corresponding to the station ST1 where the turnover travel control is performed starting from the specified point SP corresponding the station ST2. The travel control portion 41 sets the reverse travel zone S1 in which the travel vehicle 5 exceptionally travels in a direction opposite to one direction starting from the specified point SP corresponding to the station ST1 and controls a travel of the traveling vehicle 5 along the travel route including the reverse travel zone S1. That is, the travel control portion 41 causes the travel vehicle 5 to move in one direction from the specified point SP corresponding to the station ST2 to a position of the specified point SP corresponding to the station ST1 and performs the turnover travel control at the specified point SP corresponding to the station ST1 to cause the travel vehicle 5 to travel in a reverse direction in the reverse travel zone S1. Thus, the travel vehicle 5A reaches the station ST1.

The actions and effects of the travel vehicle system 1 of the present preferred embodiment will be described. The travel route along which the travel vehicle 5 located in the intra-bay-route BR1 indicated by a black and wide arrow in FIG. 1 reaches the station ST1 within the intra-bay-route BR1, will now be described. In the conventional travel vehicle system 1, a traveling direction of the travel vehicle 5 is determined to be one direction (a direction of arrow indicated on the track 11 in FIG. 1) in all of the intra-bay-route BR1 and the inter-bay-route BR2. Therefore, a travel route (a travel route indicated by dashed lines P1 in FIG. 1) along which the travel vehicle 5 reaches the station ST1 via the inter-bay-route BR2 is searched, and the travel vehicle 5 reaches the station ST1 along the travel route.

Whereas, in the travel vehicle system 1 of the present preferred embodiment, the travel control portion 41 sets the track 11 ranging from the specified point SP corresponding to the confluence portion CP at a downstream side of the station ST1 to the station ST1 as a reverse travel zone S1. Then the travel control portion 41 causes the travel vehicle 5 to travel in a reverse direction in the reverse travel zone S1 and enter the station ST1 by the turnover travel control. The travel route (travel route indicated by solid lines P in FIG. 1) including this reverse travel zone S1 is shorter than the travel route searched in the conventional way. Thus, the time until the travel vehicle 5 reaches a predetermined station ST1 can be shortened, enabling an improvement of transport efficiency.

In the map information of the travel vehicle system 1 of the present preferred embodiment, the turnover entry flag showing whether or not an entry into the station ST is caused by the turnover travel control is associated with each station ST. In order to cause the travel vehicle 5 to enter the station ST1 having the turnover entry flag showing an entry by the turnover travel control, the travel control portion 41 causes the travel vehicle 5 to travel in a reverse direction in the reverse travel zone S1 ranging from the specified point SP closest to the station ST1 at a downstream side to the station ST1 by the turnover travel control and enter the station ST1. With this configuration, by the turnover travel control, the travel vehicle 5 can enter into the station ST1 that has a possibility that the arrival time of the travel vehicle can be shortened by an entry by the turnover travel control.

In the map information of the travel vehicle system 1 of the present preferred embodiment, the turnover exit flag showing whether or not an exit from the station ST is caused by the turnover travel control is associated with each station ST. In order to cause the travel vehicle 5 to exit from the station ST2 having the turnover exit flag that shows an exit by the turnover travel control, the travel control portion 41 causes the travel vehicle 5 to travel in a reverse direction in the reverse travel zone S2 ranging from the station ST2 to the specified point SP closest to the station ST2 at upstream side by the turnover travel control and causes the travel vehicle 5 to exit from the station ST2. With this configuration, by the turnover travel control, the travel vehicle 5 can exit from the station ST that has a possibility that the arrival time of the travel vehicle with respect to the next target station ST can be shortened by an exit by the turnover travel control.

When the turnover entry flag associated with the station ST which is a destination or a source included in the transport instruction shows an entry by the turnover travel control, the command allocation portion 43 of the travel vehicle system 1 of the present preferred embodiment searches the specified point SP to be first found in a downstream direction starting from the station ST which is a destination or a source and identifies a travel vehicle 5 to be first found in an upstream direction starting from the searched specified point SP. The actions and effects of the travel vehicle system 1 with such a configuration will be described with reference to FIG. 1.

That is, with the configuration of the conventional travel vehicle system 1, despite the existence of a travel vehicle 5A close to the station ST1 along the track 11, the travel vehicle 5A may be determined to be a long way to the station ST1 (travel route indicated by the dashed lines P1) due to one-way route, thus, another travel vehicle 5 different from this travel vehicle 5A, for example, within the inter-bay-route BR2 may be selected (a transport instruction may be allocated). In this case, the time until the travel vehicle 5 reaches the station ST1 is long. Whereas, with the configuration of the travel vehicle system 1 of the present preferred embodiment, regardless of the predetermined traveling direction of the travel vehicle 5, the travel vehicle 5A closer to the station ST1 along the track 11 is selected, thus the time until the travel vehicle 5 reaches the station ST1 can be shortened.

In the present preferred embodiment, the turnover entry flag records whether or not the entry into the station ST is caused by the turnover travel control. With this configuration, only ON/OFF of flag has to be recorded, therefore, the data capacity can be reduced compared to the configuration in which the station ST and the specified point SP are associated with each other in the map information.

The preferred embodiments have been described as above, however, aspects of the present invention are not limited thereto and various changes can be made without departing from the scope of the present invention.

In the preferred embodiments, the first transport instruction and the second transport instruction that are different from each other in the types of information have been described as examples of transport instructions. There are three aspects: only the first transport instruction is transmitted from the upper controller; only the second transport instruction is transmitted from the upper controller; and both the first transport instruction and the second transport instruction are transmitted from the upper controller. Any of these aspects may be possible. In addition, a transport instruction including information different from the types of information may be possible.

In the preferred embodiments, a configuration of the track 11 including six intra-bay-routes BR1 and the inter-bay-route BR2 which is a travel path connecting between different bays has been described. Only if the track 11 includes the confluence portion CP and the branching portion BP, any layout may be possible.

In the preferred embodiments, an example of configuration in which the upper controller and the travel vehicle controller 3 are separated, has been described, however, they may be integrated.

In the travel vehicle system 1 of the preferred embodiments and the modification examples, the overhead travel vehicle 5 has been described as an example of a travel vehicle, however, other examples of travel vehicle includes an unmanned travel vehicle traveling on a track provided on ground or a rack.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A transport vehicle system, comprising:
a travel path including at least one of a branching portion and a confluence portion;
unmanned travel vehicles to travel along the travel path in one direction and transfer an article with respect to individual placement tables provided along the travel path; and a travel vehicle controller configured or programmed to control travel of each of the unmanned travel vehicles in accordance with a transport command; wherein
the travel vehicle controller is configured or programmed to include a travel control portion to search for a travel route, which is a portion of the travel path, along which each of the unmanned travel vehicles is caused to travel to a predetermined one of the placement tables included in the transport command and to cause each of the unmanned travel vehicles to travel in accordance with the travel route based on map information including information on the travel path and the placement tables when the transport command is issued;
the map information further includes information on a specified point corresponding to at least one of the branching portion and the confluence portion;
the travel controller is configured or programmed to perform one-way travel control to cause each of the unmanned travel vehicles to travel in the one direction and to perform reverse travel control that sets a reverse travel zone, which is a zone in which each of the unmanned travel vehicles is caused to travel either from the specified point in a direction opposite to the one direction or to the specified point in the direction opposite to the one direction, as at least a portion of the travel route and causes each of the unmanned travel vehicles to travel in the direction opposite to the one direction in the reverse travel zone;
a reverse entry flag showing whether or not the reverse travel control causes entry into one of the placement tables is associated with each of the placement tables in the map information;
the travel controller is configured or programmed to cause each of the unmanned travel vehicles to travel in reverse in the reverse travel zone, which extends from a specified point closest to the predetermined one of the placement tables downstream of the predetermined one of the placement tables in the one direction to the predetermined one of the placement tables, by the reverse travel control to cause each of the unmanned travel vehicles to enter the predetermined one of the placement tables in a case where each of the unmanned travel vehicles is caused to enter the predetermined one of the placement tables, which has the reverse entry flag that indicates that the reverse travel control causes entry into the predetermined one of the placement tables;
the travel vehicle controller is configured or programmed to further include a command allocator to identify an unmanned travel vehicle subject to the transport command from among the unmanned travel vehicles;
the transport command includes information on a predetermined one of the placement tables defining a destination; and
the command allocator is configured or programmed to search for the specified point, which is first found downstream in the one direction starting from the predetermined one of the placement tables defining the destination, and to search for the unmanned travel vehicle, which is first found upstream in the one direction starting from the searched specified point in a case where the reverse entry flag, which is associated with the predetermined one of the placement tables defining the destination included in the transport command, indicates that the reverse travel control causes entry into the predetermined one of the placement tables.

2. The travel vehicle system according to claim 1, wherein a reverse exit flag showing whether or not the reverse travel control causes exit from one of the placement tables is associated with each of the placement tables in the map information; and the travel controller is configured or programmed to cause each of the unmanned travel vehicles to travel in reverse in the reverse travel zone, which extends from the predetermined one of the placement tables to the specified point closest to the predetermined one of the placement tables upstream of the predetermined one of the placement tables in the one direction, by the reverse travel control to cause each of the unmanned travel vehicles to exit from the predetermined one of the placement tables in a case where each of the unmanned travel vehicles is caused to exit from the predetermined one of the placement tables, which has the reverse exit flag that indicates that the reverse travel control causes exit from the predetermined one of the placement tables.

3. A transport vehicle system, comprising:

a travel path including at least one of a branching portion and a confluence portion;

unmanned travel vehicles to travel along the travel path in one direction and transfer an article with respect to individual placement tables provided along the travel path; and a travel vehicle controller configured or programmed to control travel of each of the unmanned travel vehicles in accordance with a transport command; wherein the travel vehicle controller is configured or programmed to include a travel control portion to search for a travel route, which is a portion of the travel path, along which each of the unmanned travel vehicles is caused to travel to a predetermined one of the placement tables included in the transport command and to cause each of the unmanned travel vehicles to travel in accordance with the travel route based on map information including information on the travel path and the placement tables when the transport command is issued;

the map information further includes information on a specified point corresponding to at least one of the branching portion and the confluence portion;

the travel controller is configured or programmed to perform one-way travel control to cause each of the unmanned travel vehicles to travel in the one direction and to perform reverse travel control that sets a reverse travel zone, which is a zone in which each of the unmanned travel vehicles is caused to travel either from the specified point in a direction opposite to the one direction or to the specified point in the direction opposite to the one direction, as at least a portion of the travel route and causes each of the unmanned travel vehicles to travel in the direction opposite to the one direction in the reverse travel zone;

a reverse entry flag showing whether or not the reverse travel control causes entry into one of the placement tables is associated with each of the placement tables in the map information;

the travel controller is configured or programmed to cause each of the unmanned travel vehicles to travel in reverse in the reverse travel zone, which extends from a specified point closest to the predetermined one of the placement tables downstream of the predetermined one of the placement tables in the one direction to the predetermined one of the placement tables, by the reverse travel control to cause each of the unmanned travel vehicles to enter the predetermined one of the placement tables in a case where each of the unmanned travel vehicles is caused to enter the predetermined one of the placement tables, which has the reverse entry flag that indicates that the reverse travel control causes entry into the predetermined one of the placement tables;

the travel vehicle controller is configured or programmed to further include a command allocator to identify an unmanned travel vehicle subject to the transport command from among the unmanned travel vehicles;

the transport command includes information on one of the placement tables defining a source and on the predetermined one of the placement tables defining a destination; and the command allocator is configured or programmed to search for the specified point, which is first found downstream in the one direction starting from the one of the placement tables defining the source, and to search for the unmanned travel vehicle, which is first found upstream in the one direction starting from the searched specified point in a case where the reverse entry flag, which is associated with the predetermined one of the placement tables defining the source included in the transport command, indicates that the reverse travel control causes entry into the predetermined one of the placement tables.

4. The travel vehicle system according to claim 3, wherein a reverse exit flag showing whether or not the reverse travel control causes exit from one of the placement tables is associated with each of the placement tables in the map information; and the travel controller is configured or programmed to cause each of the unmanned travel vehicles to travel in reverse in the reverse travel zone, which extends from the predetermined one of the placement tables to the specified point closest to the predetermined one of the placement tables upstream of the predetermined one of the placement tables in the one direction, by the reverse travel control to cause each of the unmanned travel vehicles to exit from the predetermined one of the placement tables in a case where each of the unmanned travel vehicles is caused to exit from the predetermined one of the placement tables, which has the reverse exit flag that indicates that the reverse travel control causes exit from the predetermined one of the placement tables.

* * * * *